(12) United States Patent
Lu et al.

(10) Patent No.: US 9,172,489 B2
(45) Date of Patent: Oct. 27, 2015

(54) DISCOVERY OF AN ADJACENT NETWORK ELEMENT WITHIN A NETWORK DATA PLANE

(75) Inventors: Biao Lu, Cupertino, CA (US); Mohit Misra, Bangalore (IN); Maneesh Jain, Bangalore (IN); Shankara Ramamurthy, Chennai (IN)

(73) Assignee: Infinera Corporation, Sunnyvale, CA (US)

( * ) Notice: Subject to any disclaimer, the term of this patent is extended or adjusted under 35 U.S.C. 154(b) by 2097 days.

(21) Appl. No.: 11/419,419

(22) Filed: May 19, 2006

(65) Prior Publication Data

US 2007/0019954 A1 Jan. 25, 2007

Related U.S. Application Data

(60) Provisional application No. 60/695,392, filed on Jun. 30, 2005.

(51) Int. Cl.
*H04J 14/02* (2006.01)
*H04L 12/721* (2013.01)
*H04Q 11/00* (2006.01)

(52) U.S. Cl.
CPC ......... *H04J 14/0227* (2013.01); *H04J 14/0241* (2013.01); *H04L 45/62* (2013.01); *H04Q 11/0062* (2013.01); *H04J 14/0279* (2013.01); *H04Q 11/0071* (2013.01); *H04Q 2011/0088* (2013.01)

(58) Field of Classification Search
USPC ...................................... 398/25, 30; 370/254
See application file for complete search history.

(56) References Cited

U.S. PATENT DOCUMENTS

| | | | |
|---|---|---|---|
| 6,985,959 B1* | 1/2006 | Lee ............................... | 709/238 |
| 7,039,009 B2* | 5/2006 | Chaudhuri et al. ........... | 370/225 |
| 7,054,554 B1* | 5/2006 | McNamara et al. ............ | 398/30 |
| 2003/0147645 A1 | 8/2003 | Imajuku et al. | |
| 2003/0169684 A1 | 9/2003 | Yamanaka et al. | |
| 2006/0013149 A1* | 1/2006 | Jahn et al. ...................... | 370/254 |
| 2006/0256712 A1* | 11/2006 | Imajuku et al. ............... | 370/218 |

FOREIGN PATENT DOCUMENTS

EP   1335627 A2   8/2003

OTHER PUBLICATIONS

RFC-3630, "Traffic Engineering (TE) Extensions to OSPF Version 2", Katz et al., IETF, Sep. 2003.*
Link Management Protocol (LMP), draft-ietf-ccamp-lmp-10.txt by L. Lang, IETF, Oct. 2003.*

(Continued)

*Primary Examiner* — Shi K Li
(74) *Attorney, Agent, or Firm* — Ross M. Carothers; David L. Soltz

(57) ABSTRACT

The present invention provides a system, apparatus and method for discovery of network elements, which are adjacent within the network data plane but may or may not be adjacent in the network control plane. In one embodiment of the present invention, digital network elements, with a plurality thereof having a lambda switching capability (hereinafter "LSC") interface, is provided. A digital network element with an LSC interface originates and sends a local advertisement to its immediate control neighbor. Using this LSC originated advertisements; a neighboring network element may be discovered that is adjacent on the network data plane.

14 Claims, 5 Drawing Sheets

(56) References Cited

OTHER PUBLICATIONS

R. Coltun, RFC-2370, The OSPF LSA Option, Internet Society, Jul. 1998.*

ITU-T Recommendation G.692, Optical Interfaces for Multichannel Systems with Optical Amplifiers, Oct. 1998, pp. 6-7.*

Banerjee et al., "Generalized Multiprotocol Label Switching: An Overview of Signaling Enhancements and Recovery Techniques", IEEE Communications Magazine, vol. 39(7), pp. 144-151, Jul. 2001.

* cited by examiner

DISCOVERY OF AN ADJACENT NETWORK ELEMENT WITHIN A NETWORK DATA PLANE

CROSS REFERENCE TO RELATED PATENT APPLICATIONS

This application claims priority to U.S. Provisional Application Ser. No. 60/695,392, entitled "Technique for Data-Plane-Adjacent Neighbor Discovery for Network Element (NEs) that are not Control-Plane-Adjacent," filed Jun. 30, 2005, which application is incorporated herein by reference in its entirety.

BACKGROUND

A. Technical Field

The present invention relates generally to optical communication network systems, and more particularly, to the discovery of network neighbors that are not physically adjacent to each other within an optical communication system.

B. Background of the Invention

In an optical communication network system, various network elements or other network nodes are connected to each other for carrying traffic from one end to another end. There may be two types of network elements in the network namely digital nodes and optical nodes. Each of the digital nodes has Lambda (wavelength) switching capability that enables a digital node to switch lambda from one port to any other port depending on how the traffic is required to be forwarded in the network. Optical nodes on the other hand are not able to switch lambda and are merely used to transfer wavelength from one port to another after its amplification.

The location of nodes, for example digital nodes, may vary within a network. Digital nodes may be connected directly or there can be one or more optical amplifiers between them. Even when two digital nodes are not physically adjacent they may behave like virtually adjacent neighbors (referred to as "virtual digital neighbors") in order to exchange certain kinds of information. It is an essential requirement within an optical network that these digital nodes identify their virtual neighbors when they are not physically adjacent.

Typically, network neighbors (whether digital or optical) are discovered by using a "HELLO" protocol 100 as shown in FIG. 1 and which is commonly known within the art. This protocol is responsible for establishing and maintaining neighbor relationships and ensuring bidirectional communication between all neighbors which are Digital NE 1 101, Digital NE 2 102 and Digital NE 3 103.

In this "Hello" protocol, 'Hello' packets are sent to all router interfaces at fixed intervals. When a router sees itself listed in its neighbor's "Hello" packet it establishes a bidirectional communication. An attempt is always made to establish adjacencies over point-to-point links so that the neighbors' topological databases may be synchronized.

However, the traffic engineering topology view of a generalized multi-protocol label-switching ("GMPLS") network provides a data-plane connectivity view of the network, which is represented at an appropriate layer of switching/connectivity capability. The traffic engineering topology gives a view of only digital nodes and not optical amplifiers, thus it may differ from the physical topology of the network when the digital nodes are not be physically adjacent and have optical amplifiers in between. In this scenario, HELLO protocol may not be efficient enough to locate the virtual neighbors.

Therefore, there is a need for a system, apparatus and method for providing discovery of neighboring network elements that are not adjacent within the network control plane.

SUMMARY OF THE INVENTION

The present invention provides a system, apparatus and method for discovery of network elements, which are adjacent within the network data plane but may or may not be adjacent in the network control plane. In one embodiment of the present invention, digital network elements, with a plurality thereof having a lambda switching capability (hereinafter "LSC") interface, is provided. Each digital network element, with a LSC interface, originates and sends a local advertisement to its immediate control neighbor. In one embodiment, the immediate control neighbor may be another digital network element, with an LSC interface, that receives the local advertisement and respond with an advertisement of its own for that interface. In another embodiment, the immediate control neighbor is a lower-layer element, such as an optical amplifier(s), that effectively forwards the advertisement to the next control neighbor. Using these LSC originated advertisements, a neighboring network element may be discovered that is adjacent on the network data plane.

In various embodiments of the invention, the immediate neighboring network element may be an optical network element that receives the local advertisement and forwards the local advertisement to a next immediate control neighbor. If the immediate control neighbor of the optical network element is a digital network element, the digital network element may respond with an advertisement of its own resulting in the data plane-adjacent neighbor being discovered.

In various embodiments of the invention, a chain of more than one optical network element between any two digital network elements with LSC interfaces may exist. In such cases, a series of local advertisements may be originated and forwarded in the chain until the next network element with an LSC interface or the data-plane-adjacent neighbor is discovered. This discovery would occur when a response message is received at the originating LSC interface.

The digital network element with an LSC interface multiplexes or de-multiplexes traffic at a transmitting or receiving end. The traffic may be sent and received on an optical channel group having a collection of 'N' number of wavelengths. Further, a local advertisement may be sent and received on a separate control link such as optical servicing channel. The local advertisement may be defined as a link opaque link state advertisement or "link opaque LSA."

In another embodiment of the invention, an optical network system having a neighbor discovery technique is provided. The optical network system may be an optical long-haul network system that comprises a plurality of communicatively coupled digital network elements, each having a "LSC" interface that sends a local advertisement to its immediate control neighbor. The digital network elements may be connected to one or more optical network elements that receive the local advertisement and forward the same to a next immediate control neighbor.

The optical network system may further comprise an optical channel group that carries traffic to the digital and optical network elements. A control channel is also provided in the system that builds point-to-point links between any two immediate control neighbors. This control channel may be used so that a neighboring network element, other than an immediate control neighbor, is discovered when a digital network element with an LSC sends a local advertisement to its immediate control neighbor, and receives a response with an advertisement of another digital network element with LSC.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
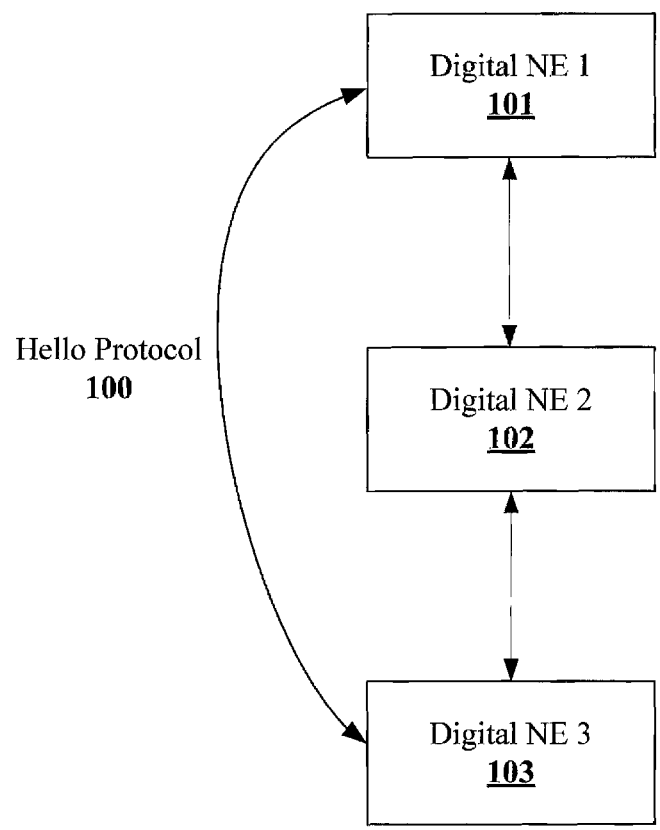
FIG. 1 illustrates a prior art approach for discovery of network neighbor elements that are control plane adjacent.

A system, apparatus and a method are described for discovery of network elements, which are adjacent within a network data plane but not adjacent in the network control plane.

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

The typical destinations for traffic messages coming from various customer sources are intended for digital network nodes and not optical nodes. If an optical node receives such traffic, it simply forwards the traffic to another node until a digital node is found so that the traffic may be processed accordingly. The digital nodes are configured to exchange control information between the nodes (optical and digital). These control messages may include local binding information that contains data about a local transmitter node or information about time slots that are alotted in the digital nodes for adding or dropping the traffic.

The time slots are defined in the hardware of the digital nodes for building cross conections. The cross connections communicate traffic coming from one port to another port using these different time slots. A large number of cross connects may be required at each node depending on the amount and type of traffic at the particular node(s). Traffic is typically communicated in separate time slots and the same time slots may be maintained on any two digital nodes when they are exchanging traffic. Once the traffic is dropped at a node, the alotted time slots associated with that dropped traffic become free. A free time slot can be used for sending other traffic or otherwise re-aligned.

The cross connects are typically configured when the node is initially installed and the connections within the cross connects may be defined during this configuration process or some time later. The cross connections in the digital nodes may be configured manually wherein each digital node is configured in terms of input/output port, or the time slots being used. The cross connections in the digital nodes may also be created automatically by sending messeges to any node and for creating a circuit from the node to any other node.

This configuration effectively establishes the traffic route that is being used to communicate traffic. Depending on the characteristics and length of fiber used to connect two digital network elements, the signal path may also contain optical amplifiers or regenerators that enhance the signal along its path. These devices may be intermediary devices may be transparent on a network data plane but nevertheless be present on the network control plane. The discovery process for peer digital network elements is able to account for these optical, lower-layer nodes.

Figure 2:
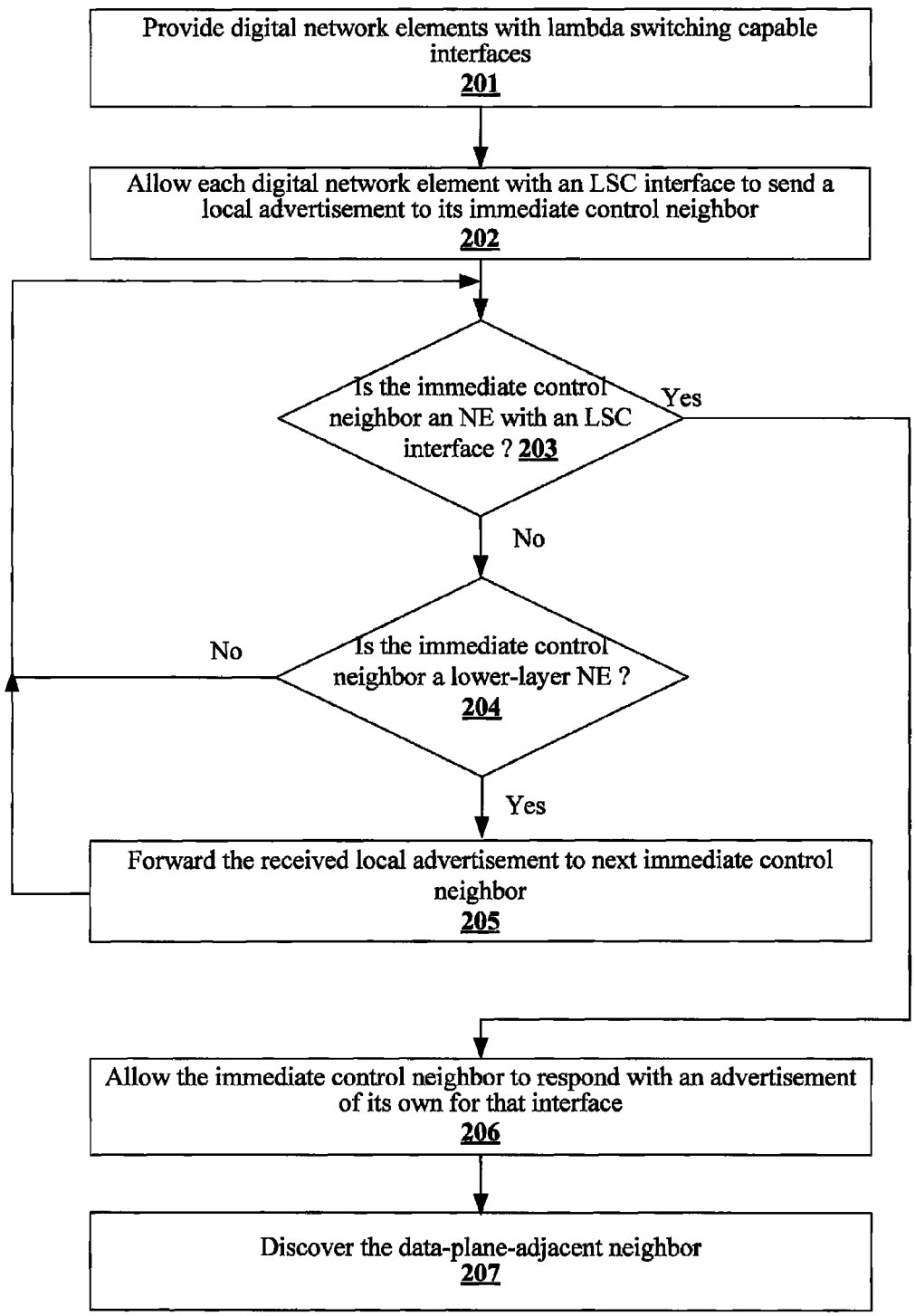
FIG. 2 illustrates a general method for discovery of neighboring network elements in the data plane of a network according to one embodiment of the invention.

FIG. 2 illustrates a general method for discovery of a neighboring network element in a network data plane. The method may be initiated by providing digital network elements with LSC interfaces 201. Each of these network interfaces sends a local advertisement to its immediate control neighbor 202 on one or more optical service channels. If the receiver of this advertisement is a digital node 203, it discovers the digital neighbor by matching the received OCG types with ones it is supporting. If a match is found it responds by generating its own local advertisement towards the same control neighbor from where it received the advertisement 206. If no OCG types match then neighbor discovery is aborted and response is not sent.

If the recipient of local advertisement is a lower-layer network element 204 (such as an optical amplifier), then the local advertisement that was received by the lower-layer network element is forwarded in its own link local advertisement towards its next immediate control neighbor 205. This forwarded advertisement may be transmitted on an optical supervisory channel or channels.

The step may then be repeated so if the next immediate control neighbor of the lower-layer network element is a digital network element, it may respond with an advertisement of its own 206, and the data-plane-adjacent neighbor is discovered 207. If there is a chain of more than one lower-layer network elements between two digital network elements with LSC interfaces, then a series of local advertisements (e.g, one per lower-layer network element) may be originated and forwarded in the chain until the next digital network element with an LSC interface is discovered. A response is provided from the receiving LSC interface and it is subsequently discovered by the originating LSC.

B. Discovery of Neighboring Network Elements within a Network Data Plane

Figure 3:
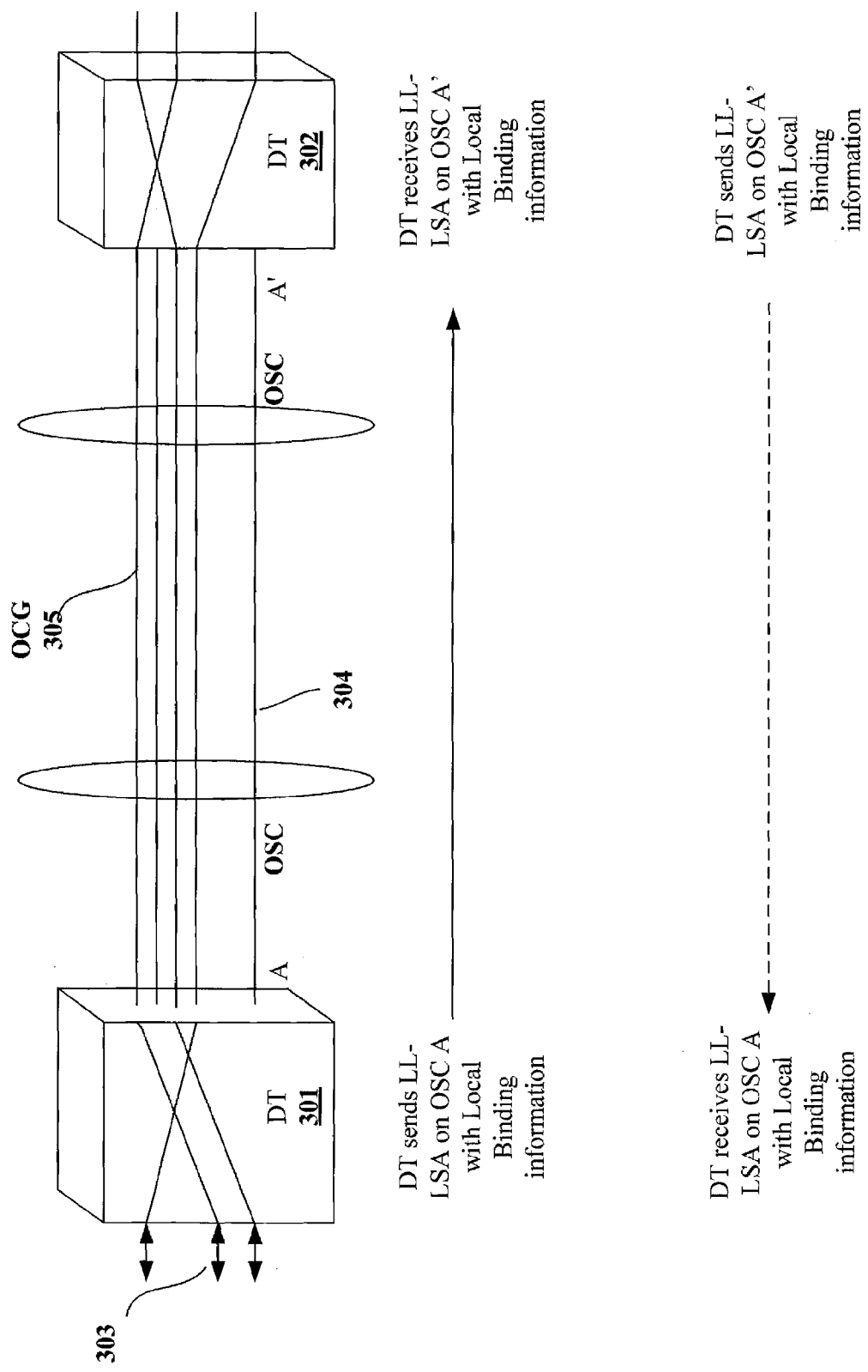
FIG. 3 illustrates data-plane neighboring network element discovery according to one embodiment of the invention

FIG. 3 structurally illustrates the discovery of a neighboring network element within a network data plane according to one embodiment of the invention. The present invention provides a plurality of digital nodes, within a network, with the ability to discover virtual data plane neighboring network elements. According to the embodiment shown in FIG. 3, two digital nodes may be directly connected by optical fiber. In this example, there is no intermediary optical amplifier which suggests that a signal is able to be communicated between the nodes without amplification or regeneration.

A first digital node or digital terminal ("DT") 301 is connected to a second digital terminal (DT) 302. These digital terminals 301, 302 are configured using a management station in order to receive, process and transfer traffic as well as communicate control signals. This configuration process includes providing each digital node 301, 302 with an LSC (Lambda Switching Capability) interface defining a number of cross connections and time slots to be associated with network traffic.

The first DT 301 receives and multiplexes traffic 303 coming from various customer sources over an optical channel group ("OCG") 305. Before sending the multiplexed traffic 303 to the destination, the first DT 301 needs to discover its destination or the data plane neighbor where the data traffic should be sent. The first DT 301, which has a configured LSC interface, sends a local advertisement, such as a local opaque link state advertisement, on optical service channel A to its immediate control neighbor, which is the second DT 302. If the second DT 302, also having an LSC interface, receives the advertisement, it responds on optical service channel A' with an advertisement of its own for that interface. After reception of this response message, the first DT 301 discovers the second DT 302 as its data-plane-adjacent neighbor.

The multiplexed data traffic 303 may then be sent on the optical channel group 305. An optical channel group 305 is a collection of "N" wavelengths or lambdas that communicate network traffic between nodes. For example, if 10 wavelengths are carried on one optical channel group, then four optical channel groups would be equivalent to 40 wavelengths as shown in FIG. 3 as the "OCG" 305. The data traffic 303 would be transmitted on one or more of these 40 wavelengths between the first DT 301 and the second DT 302.

Comparatively, a local advertisement is sent on a separate optical servicing channel (OSC) 304. The OSC 304 is a control channel that is responsible for building point-to-point links A-A' between control plane neighbors 301, 302. Typically, data traffic 303 is not communicated on these optical servicing channels, but control/service information such as local advertisement messages are reserved for these channels. In one embodiment, a local advertisement contains the following information:

Number of OCGs carried in the physical link
  Properties of each OCG such as advertising router ID, Interface Index, Band ID, OCG ID, AID, Channel usage for 10 G or 2.5 G bandwidth etc.

A response to a local advertisement is another local advertisement generated by the receiving node, which contains the similar information pertaining to its own side of link. Using this information, a communication link may be established between the first DT 301 and the second DT 302.

Figure 4:
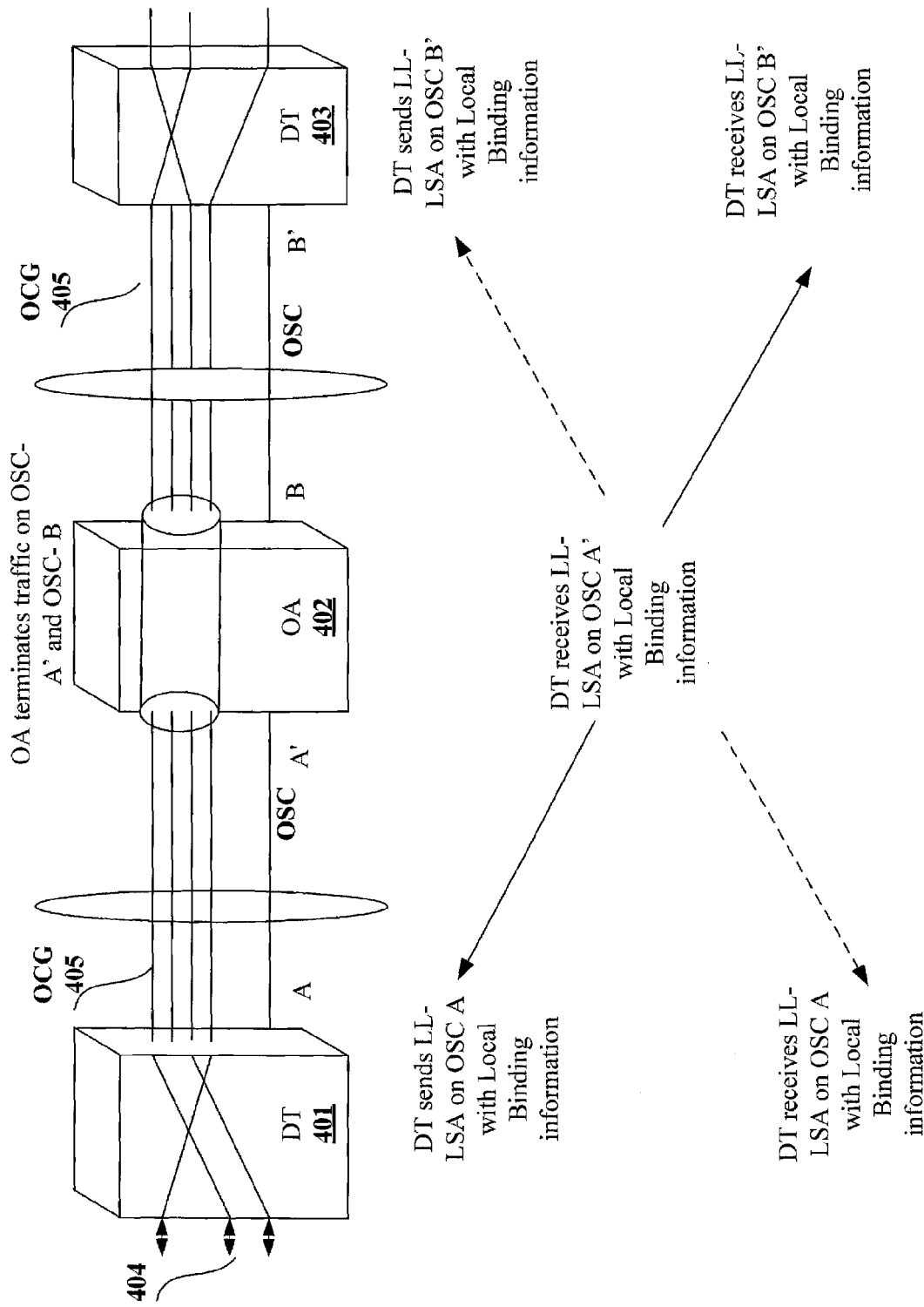
FIG. 4 illustrates data-plane neighboring network element discovery according to another embodiment of the invention

FIG. 4 illustrates the discovery of digital network elements that are adjacent on a network data plane but connected by an intermediary lower-layer network element according to another embodiment of the invention. As explained earlier, discovery messages are intended to be sent only to digital nodes. However, when an intermediary optical node, such as optical amplifier, is located between two digital node, then the the message should be transferred to a receiving digital node via the intermediary optical node.

When a message comes from a customer source, the digital nodes are configured and the cross connections are created to define various time slots, which are alotted to communicate particular traffic. Once time slots are alotted to particular traffic, these slots are effectively designated as "busy" and may be used by other traffic only when the alloted traffic is is dropped at a digital node. This "dropped" information should to be sent to a destination digital node so that it can also use the same time slots to receive messages. When a lower-layer optical node is present between two digital nodes, the message is sent to the optical node via a local link and then the nessage is forwarded to the destination.

A first digital terminal (DT) 401 having an LSC interface sends a local advertisement (e.g., a Link Local Opaque Link State Advertisement (LL-LSA)) to the optical amplifier 402. A Link Local-LSA is a custom OSPF Type-9 Link Local Opaque LSA is used to carry link binding information Label Set (channel availability) and other proprietary information. The flooding scope of this LSA is local to a link.

The first DT 401 sends a local advertisement on optical service channel A, including an LL-LSA, along with link local information. Link Local information is data describing the properties of OCGs, and available time slots.

An optical amplifier (OA) 402 receives the local advertisement and binding information on the local link OSC-A. This local advertisement and binding information is forwarded to a second DT 403, which is its next immediate control neighbor. The second DT 403 in turn may respond with an advertisement of its own to the optical amplifier 402 on the local link. The optical amplifier 402 then transfers the information from the second DT 403 to the first DT 401. As a result of this process, the second DT 403 is discovered as the data-plane-adjacent neighbor of the first DT 401.

Figure 5:
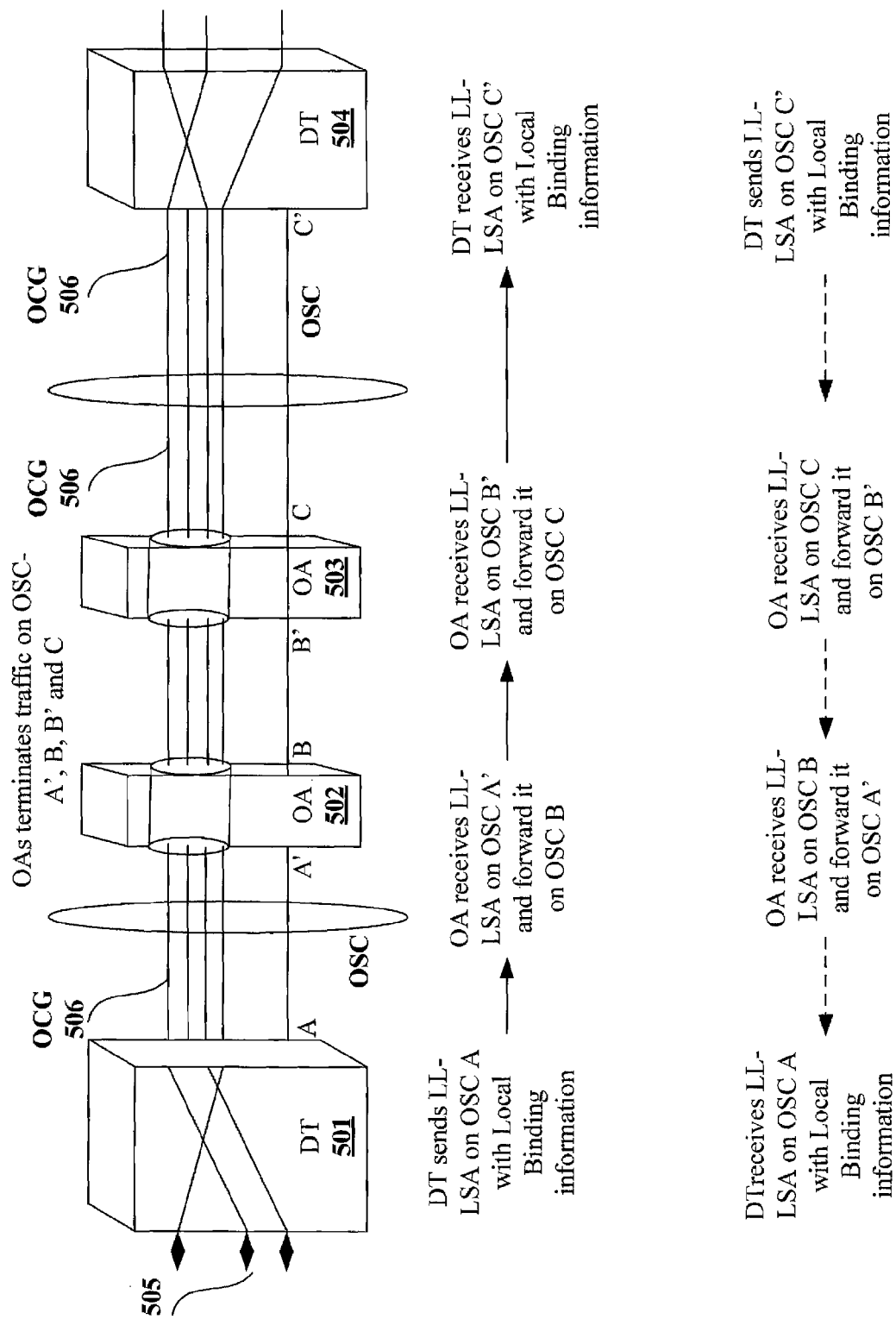
FIG. 5 illustrates data-plane neighboring network element discovery according to another embodiment of the invention.

FIG. 5 is an illustration of discovering network elements that are adjacent within a network data plane but separated by multiple intermediary lower-level optical devices according to one embodiment of the invention. In this particular example, a first DT 501 and a second DT 504 are adjacent digital network elements in the data plane but separated by two optical amplifiers. When the digital terminal DT 501, having an LSC interface, transmits a local advertisement, including an LL-LSA, on optical service channel A.

A first optical amplifier 502 receives the local advertisement along with any binding information on optical service channel A'. This advertisement and binding information is forwarded on optical service channel B by the first optical amplifier 502 to a second optical amplifier 503 that receives the data on optical service channel B'. The second optical amplifier 503 forwards the advertisement and binding information on optical service channel C to the next network element, which is the second DT 504. As previously stated, if a chain of lower-layer optical nodes (e.g., optical amplifiers) exists between two digital nodes, a series of local advertisements are transmitted along the chain until the next digital network element with an LSC interface or the data-plane-adjacent neighbor is discovered.

The second DT 504 receives the advertisement and binding information on optical service channel C'. This advertisement and information is processed and the second DT 504 transmits a response with an advertisement of its own. This response message is passed along the chain of lower-layer network elements on the optical service channels unit the first DT 501 receives it. Upon receiving the response message, the first DT 501 is able to discover a network element that is adjacent on the network's data plane but still physically separated by lower-level optical nodes (in this example, optical amplifiers).

In this particular embodiment, the optical amplifiers only have two interfaces to receive or forward the traffic, so it is relatively simple for optical amplifier to pick the right forwarding interface upon knowing on which interface the LL-LSA was received. In effect, the advertisement is passed through the optical amplifier or amplifiers until a digital node is found.

The foregoing description of the invention has been described for purposes of clarity and understanding. It is not intended to limit the invention to the precise form disclosed. Various modifications may be possible within the scope and equivalence of the appended claims. For example, an optical box may also translate the control messages to the next node whenever required.

We claim:

1. A method in which a first digital network element discovers a second digital network element, a plurality of optical signals being communicated between the first digital network element and the second digital network element, each of the plurality of optical signals having a corresponding one of a plurality of wavelengths, the plurality of wavelengths being divided into groups of wavelengths, each of the groups of wavelengths being a corresponding one of a plurality of optical channel groups, the method comprising:

transmitting, on a first optical service channel from the first digital network element to the second digital network element, a first local advertisement including first information identifying a number of the plurality of optical channel groups carried on a physical link extending from the first digital network element to the second digital network element;

receiving the first local advertisement at the second digital network element;

processing the first local advertisement at the second digital network element; and transmitting a second local advertisement including second information from the second digital network element to the first digital network element on a second optical service channel, the second information indicating that the second digital network element is configured to receive said at least one of the plurality of optical channel groups.

2. The method of claim 1 wherein the first and second digital network elements are configured to switch traffic using cross connections having a plurality of time slots.

3. The method of claim 2 wherein the plurality of time slots is configured by binding information communicated between the first and second digital network elements.

4. The method of claim 1 wherein the local advertisement comprises a local opaque link state advertisement.

5. The method of claim 4 wherein the local opaque link state advertisement and binding information are provided to the second digital network element.

6. The method of claim 1 wherein the first optical service channel is transmitted on a first wavelength and the second optical service channel is transmitted on a second wavelength, the first and second wavelengths being the same.

7. The method of claim 1 wherein the first information includes a number of the plurality of optical channel groups.

8. The method of claim 7 wherein the first information includes one or more properties of each of the plurality of optical channel groups, the one or more properties selected from a group of properties including an advertising router ID, an interface index, a band ID, an OCG ID, an AID, a channel usage for 10 G bandwidth, and a channel usage for 15 G bandwidth.

9. A system for discovering adjacent elements within a network data plane, the system comprising:

a first and a second digital network element, each configured to switch traffic;

an optical channel group, coupled between the first and second digital network elements, that communicates multiplexed optical traffic; and an optical service channel, coupled between the first and second digital network elements, that communicates first and second local advertisements between the first and second digital network elements during a peer discovery process, wherein the first local advertisement includes first information identifying a number of the plurality of optical channel groups carried on a physical link extending from the first digital network element to the second digital network element, and the second local advertisement includes second information indicating that the second digital network element is configured to receive one of the plurality of optical channel groups.

10. The system of claim 9 wherein the optical service channel is a first of a plurality of optical service channels, the system further comprising a lower-layer optical element, the first network element coupled to the lower-layer optical element via the first of the plurality of optical service channels, the lower-layer optical element coupled to the second network element via a second of the plurality of optical channels, the optical element configured to receive the first local advertisement from the first network element on the first optical service channel and transmit the first local advertisement to the second network element on a second optical service channel.

11. The system of claim 10 wherein the first optical service channel and the second optical service channel are on the same wavelength.

12. The system of claim 10 wherein the lower-layer optical element includes an optical amplifier.

13. A method in which a first digital network element discovers a second digital network element, a plurality of optical signals being communicated between the first digital network element and the second digital network element, each of the plurality of optical signals having a corresponding one of a plurality of wavelengths, the plurality of wavelengths being divided into groups of wavelengths, each of the groups of wavelengths being a corresponding one of a plurality of optical channel groups, the method comprising:

transmitting, on a first optical service channel from the first digital network element to a first of a plurality of lower-layer network elements, a first local advertisement including first information identifying a number of the plurality of optical channel groups carried on a physical link extending from the first digital network element to the second digital network element;

transmitting the first local advertisement from the first of the plurality of lower-layer network elements to a last of the plurality of lower-layer network elements, the first local advertisement being transmitted through each of the remaining ones of the plurality of lower-layer network elements;

transmitting the first local advertisement on a second optical service channel from the last of the lower-layer network elements to the second digital network element;

receiving the first local advertisement at the second digital network element;

processing the first local advertisement at the second digital network element; and transmitting on a third optical service channel from the second digital network element to the last of a plurality of lower-layer network elements, a second local advertisement including second information indicating that the second digital network element is configured to receive said at least one of the plurality of optical channel groups;

transmitting the second local advertisement from the last of the plurality of lower-layer network elements to the first of the plurality of lower-layer network elements, the second local advertisement being transmitted through each of the remaining ones of the plurality of lower-layer network elements; and transmitting the second local advertisement on a fourth optical service channel from the first of the lower-layer network elements to the first digital network element.

14. The method of claim 13 wherein at least one of the plurality of lower-layer optical elements is an optical amplifier.

* * * * *